Figure 4:
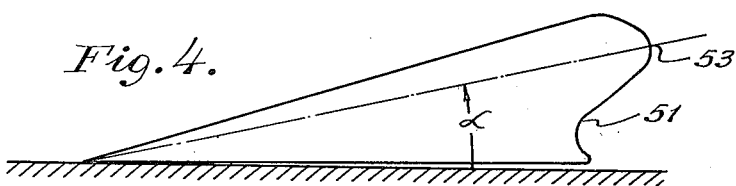

Dec. 29, 1953    J. LYMAN ET AL    2,664,560
RADIO AID TO NAVIGATION
Filed Dec. 1, 1949    3 Sheets-Sheet 1
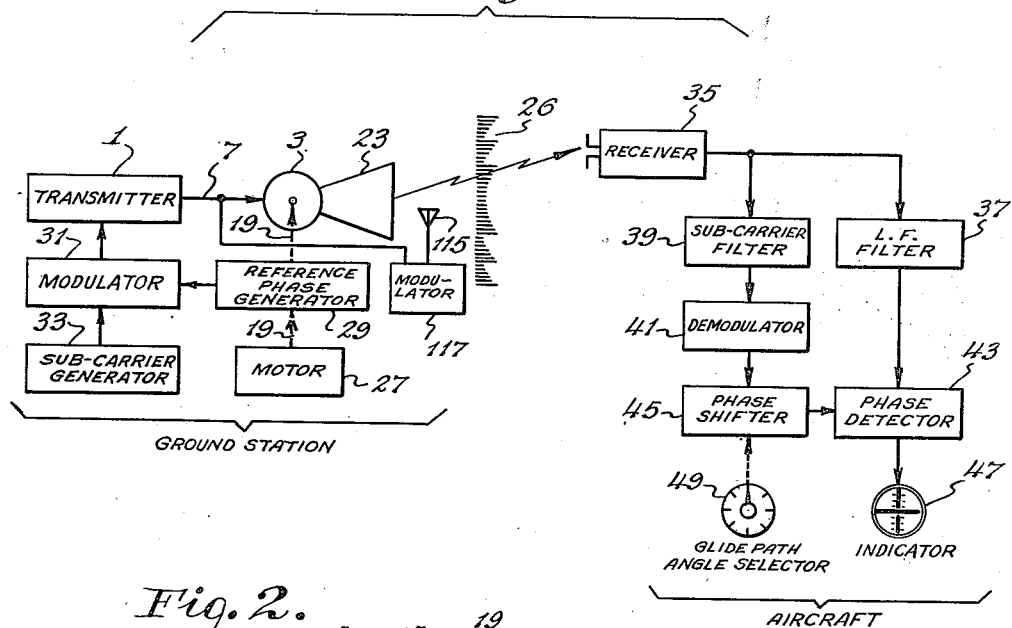
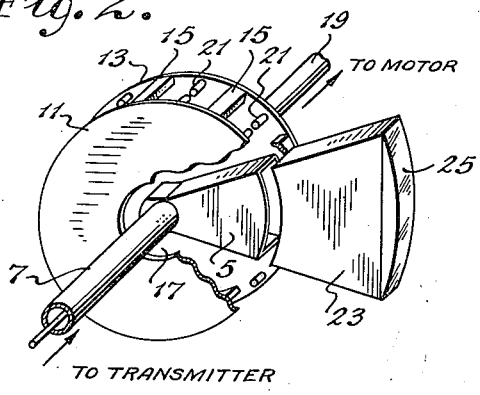
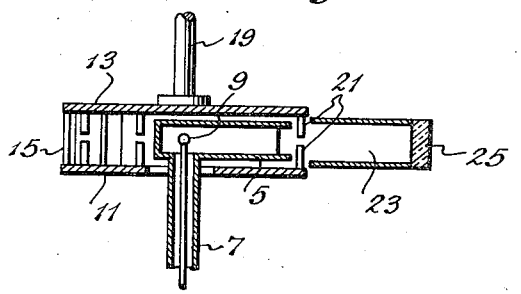
INVENTORS
JOSEPH LYMAN
GEORGE B. LITCHFORD
BY
Paul B. Hunter
ATTORNEY Dec. 29, 1953 J. LYMAN ET AL 2,664,560
RADIO AID TO NAVIGATION
Filed Dec. 1, 1949 3 Sheets-Sheet 2

INVENTORS
JOSEPH LYMAN
GEORGE B. LITCHFORD
BY
Paul B. Hunter
ATTORNEY

Dec. 29, 1953   J. LYMAN ET AL   2,664,560
RADIO AID TO NAVIGATION
Filed Dec. 1, 1949   3 Sheets-Sheet 3
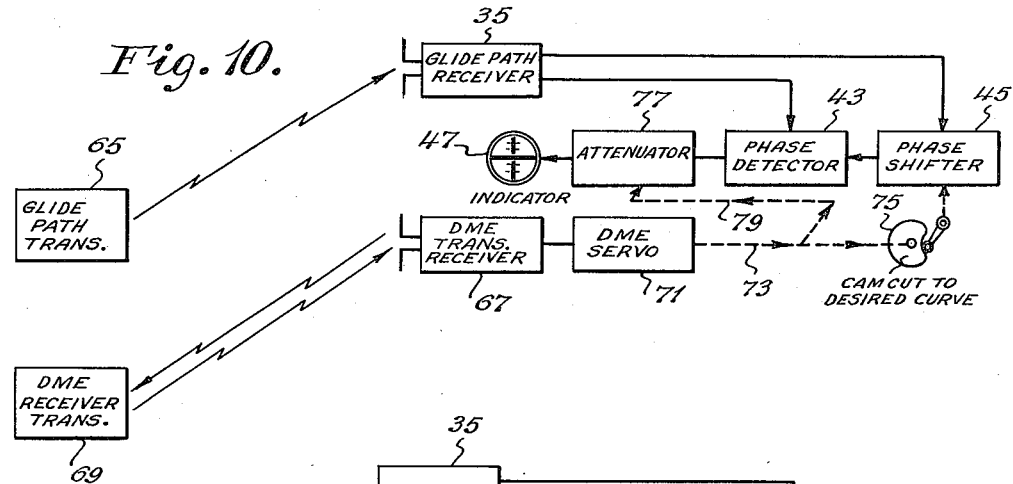
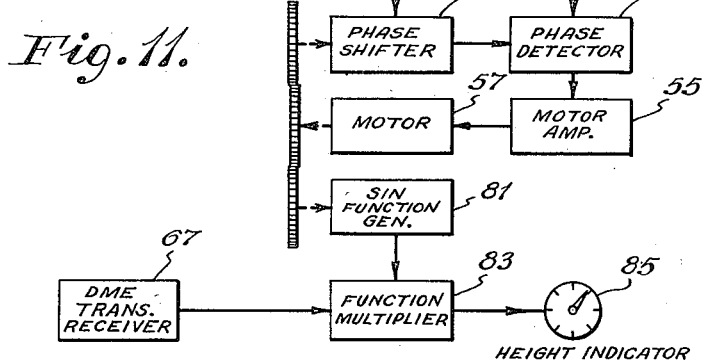
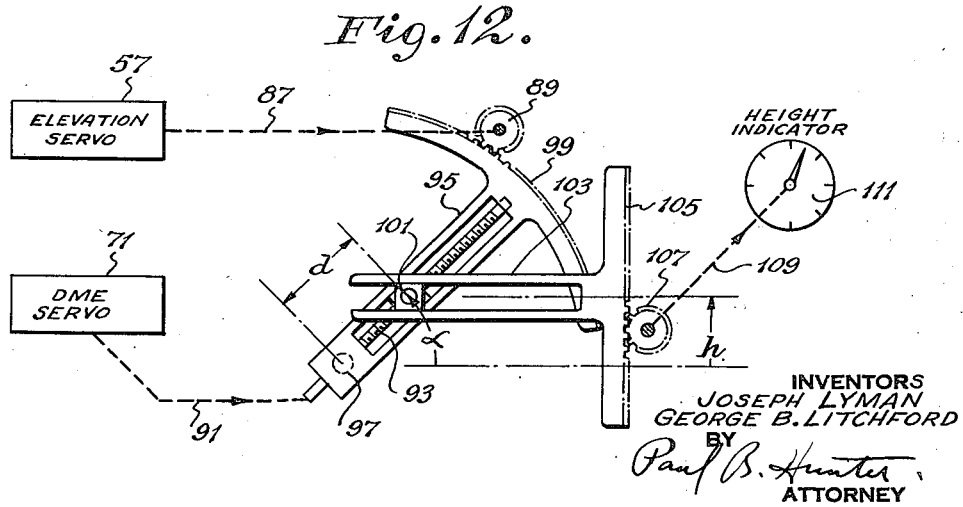
INVENTORS
JOSEPH LYMAN
GEORGE B. LITCHFORD
BY
Paul B. Hunter
ATTORNEY Patented Dec. 29, 1953

2,664,560

UNITED STATES PATENT OFFICE 2,664,560

RADIO AID TO NAVIGATION

Joseph Lyman, Huntington, and George B. Litchford, Cold Spring Harbor, N. Y., assignors to The Sperry Corporation, a corporation of Delaware Application December 1, 1949, Serial No. 130,446

13 Claims. (Cl. 343—6)

This invention relates to radio aids to the navigation of aircraft, and more particularly to improvements in instrument landing or ground approach systems, wherein radio means are used to guide an aircraft or direct the pilot thereof so as to fly a predetermined path, such as a glide path.

Prior art radio glide path systems have generally been either of the constant intensity type or of the equisignal type. In the constant intensity system, a single stationary beam is directed over the landing strip in such manner that one of its lower contours of uniform field strength conforms as nearly as possible with the desired glide path. The airplane is flown so as to keep the received signal strength constant at the proper level, and thus the pattern contour is followed to or near the ground.

The equisignal type glide path system uses two overlapping beams, one above the other (i. e. at a higher angle) and distinctively modulated. The center of the overlapping region is made to coincide with the desired glide path. The aircraft is flown so as to maintain the intensities of the distinctively modulated signals equal.

The constant intensity glide path system is open to the objection that the proper contour must be located by independent means, such as an altimeter in the aircraft used in conjunction with one or more marker beacons at check points along the approach path. Moreover, the path is not straight throughout any substantial portion of its length, but curves from a relatively steep slope where the aircraft enters the contour to a nearly flat portion near the ground.

The equisignal glide path system will define a single straight path without requiring any external calibration, and within the zone of overlap of the two beams, the amount of deviation of the aircraft above or below the equisignal plane is indicated by the difference in amplitude of the two received signals. However, two antennas are usually required, and they may be spaced apart vertically by a considerable distance.

Although they are energized from a common transmitter, the antennas must be supplied through separate feed lines and modulators, constituting two substantially independent channels. Any variation in the transmission through one channel with respect to that through the other will change the angular elevation of the equisignal plane.

The use of separated radiators introduces other difficulties in addition to the possibility of variation in the position of the equisignal plane. The apparent origin of the radiation becomes indefinite as the lower end of the glide path is approached; the equisignal surface is not ideally plane, but may be undesirably curved, and can be so distorted as to produce a "roller coaster" effect.

Since the antenna system must be offset laterally from the landing strip so as not to obstruct it, the horizontal radiation pattern must be wide enough to cover the entire glide path, and the vertical patterns should be uniform throughout the angle of horizontal coverage. This condition is substantially impossible of fulfillment with vertically spaced antennas; in practice, a compromise is effected by making the horizontal patterns of the upper and lower antennas different, in such manner as to balance one type of distortion by another. It will be apparent that this sort of expedient tends to increase the difficulty of adjusting the system for proper performance; and to aggravate the effects of any random variations in transmission through the two feed channels.

As mentioned above, the equisignal system provides quantitative information about vertical deviation from the glide path within the overlapping zone of the two beams. Outside this zone, the indication is merly "up" or "down," and the extent of the deviation is not shown. In order to provide for the different characteristics of different aircraft, it is desirable to allow a choice of glide path angle, making it possible to fly a path somewhat steeper or less steep than the equisignal plane. Preferably the selection of glide angle should be made in the aircraft. This can be done by operating with the indicator off-center, by adjusting the gains differentially for the different modulation signals, or by applying a bias to the indicator. The adjustment may be made as a function of signal strength or distance from the touchdown point to provide "flare," or decrease of slope as the ground is approached, for example.

Since an aircraft above or below the overlap zone of the two beams will receive no information as to how far it is above or below the equisignal plane, the choice of glide angles is limited to this zone. The angular width of the overlap zone must be kept fairly small to provide a reasonably large response to small deviations of the aircraft from the glide path. Thus a compromise is necessary between the contradictory requirements of large angular coverage in elevation and accuracy of operation.

One of the principal objects of the present invention is to provide radio beam systems for the guidance of aircraft wherein large variations in the transmission characteristics of the feed system or in the amplitude of any of the radiated signals can have no substantial effect upon the accuracy of operation of the system as a whole.

Another object of the invention is to provide systems of the described type using a single radiator structure, thus avoiding the various difficulties which result from the use of two vertically spaced radiators.

A further important object is to provide a glide path system or the like which has no equisignal plane or similar principal axis, but provides unambiguous quantitative elevation angle information throughout a wide angular range.

Still another object is to provide a system of the described type capable of providing uniform coverage throughout a wide angle of azimuth.

Another object is to provide a glide path system in which the angle of the glide path and also its shape, curvature or flare can be controlled on board the aircraft.

It is also an object of this invention to provide radio guidance systems including improved height finder means for determining the height or altitude of an aircraft above a reference plane such as that of a landing field, irrespective both of the barometric altitude and the terrain clearance or absolute altitude.

It is also an object of the invention to provide a combined radiator and modulator structure for producing a directive radio beam of the type peculiar to the presently contemplated guidance systems.

Figure 6:
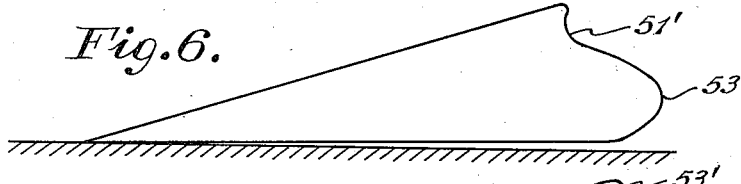
Figure 7:
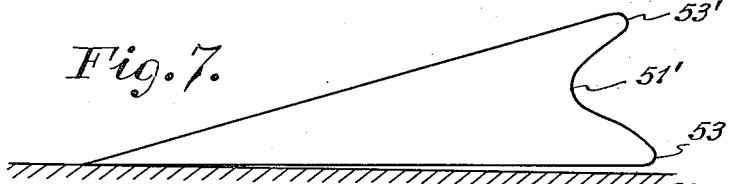
Figure 8:
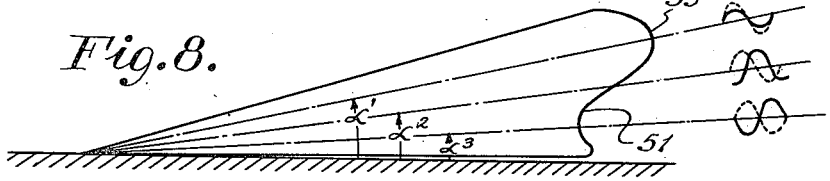
Figure 9:
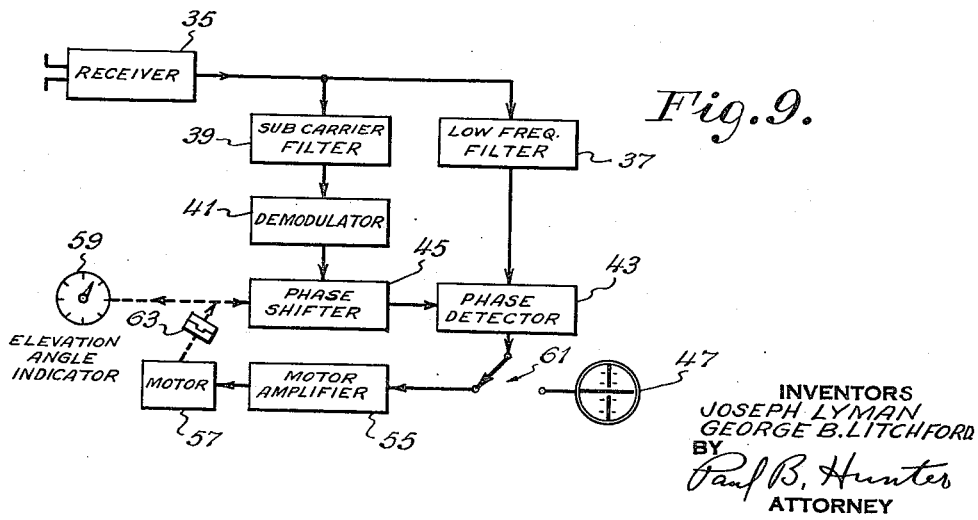

The invention will be described with reference to the accompanying drawings, wherein:

Fig. 1 is a schematic block diagram of a radio glide path system embodying the present invention, Fig. 2 is a perspective view, partly broken away to show internal details of an antenna structure suitable for the system of Fig. 1, Fig. 3 is a plan section of the structure of Fig. 2, Figs. 4, 5, 6 and 7 show the radiation pattern in a vertical plane of the antenna of Figs. 1–3 at various instants during the modulation cycle, Fig. 8 is a diagram similar to that of Fig. 4 but in addition showing the phase relationship between a reference phase modulation and the modulation caused by field pattern variation at various elevation angles, Fig. 9 is a schematic block diagram of the airborne portion of a system for indicating the elevation angle of an aircraft with respect to a reference plane, Fig. 10 is a schematic block diagram of a modification of the system of Fig. 1 to provide a curved or flared glide path, Fig. 11 is a schematic block diagram of a height finder system embodying the invention and incorporating some of the elements of a glide path system like that of Fig. 1, and Fig. 12 illustrates a mechanical computer device suitable for use in the system of Fig. 11.

The glide path system shown in Fig. 1 includes a ground station located in the vicinity of an airport runway or landing strip, and an aircraft station carried aboard each craft which is to use the system. A transmitter 1 and a special directive antenna 3 are provided at the ground station. Preferably the transmitter is designed to operate at a frequency of the order of 5000 megacycles per second. The antenna 3 is arranged to provide a beam which is space-modulated in a phase which varies with elevation angle, as will be described.

Figs. 2 and 3 illustrate a type of antenna which is at present preferred for use as the element 3 of Fig. 1. A small directive horn 5 is connected to and may be supported on the end of the outer conductor of a coaxial transmission line 7. The inner conductor of the line 7 extends into the horn and terminates therein as a radiator element 9. The axis of the line 7 and the radiator 9 is substantially horizontal.

The horn 5 is surrounded by a drum-shaped structure comprising parallel conductive discs or plates 11 and 13, connected together at their peripheries by bars 15 of insulating material. An aperture 17 is provided in the disc 11 for the line 7, and the drum assembly is supported at the end of a shaft 19 for rotation about the axis of the radiator 9.

A plurality of phase front modifying elements 21 are provided around the edge of the drum structure at intervals equal to or somewhat greater than the height of the mouth of the horn 5. The elements 21 comprise conductive stubs arranged in pairs extending inwardly toward each other from the discs 11 and 13.

A second horn 23 is arranged substantially as an extension of the horn 5, outside the drum assembly. A lens system, including a dielectric lens 25 at the mouth of the horn 23 and a cellular metal lens 26 (Fig. 1) in front of the horn, may be provided for producing a sharper beam than that which would result from the use of the horns 5 and 23 alone.

Returning to Fig. 1, the transmitter 1 is connected to the antenna 3 by way of the line 7. The shaft 19 extends to and is driven by a motor 27 at a nominally constant speed of, for example, 30 revolutions per second. A reference phase generator 29 comprising a small alternator is also driven by shaft 19 in synchronism with the drum assembly of the antenna 3. The frequency of the generator 3 is the same as that of the passage of the phase front modifying elements 21 across the mouth of the horn 5. Thus, assuming that there are ten of the elements 21, the generator 29 is arranged to operate at 300 cycles per second.

A modulator 31 is supplied with the output of the generator 29 and also with the output of a subcarrier generator or oscillator 33, which may operate at a frequency of say 10,000 cycles per second. The modulator 31 provides an output comprising a 10,000 cycle subcarrier which is modulated by the 300 cycle output of the reference phase generator. This output is applied to the modulation input terminals of the transmitter 1 to modulate the high frequency carrier. Either of the carrier and subcarrier modulations may be in amplitude or in frequency.

The aircraft station includes a receiver 35, designed to respond to radiation from the ground station and to reproduce the modulation provided by the modulator 31. The output of the receiver 35 goes to a low frequency filter 37, designed to pass 300 cycles per second, and also to a subcarrier filter 39 which passes 10,000 cycles per second. The subcarrier signal is applied to a demodulator 41 to reproduce the 300 cycle reference phase signal originating at the generator 29.

A phase detector 43 is provided with one of its input circuits connected to the 300 cycle filter 37 and its other input circuit connected, by way of an adjustable phase shifter 45, to the demodulator 41. The output of the phase detector 43 is applied to an indicator 47, for example one of the zero-center meter elements of a cross-pointer instrument. The phase shifter 45 is manually adjustable by means of a dial and pointer arrangement 49, which may be calibrated in terms of elevation angle.

In the operation of the system of Fig. 1, the high frequency output of the transmitter 1 is radiated through the horn 23 and the lens 26 in a beam covering, for example, the sector in elevation from one-half degree to ten degrees above the horizontal plane, and a relatively wide sector in azimuth, say forty-five degrees. Owing to the presence of one of the phase front modifying elements 21 in the space between the horns 5 and 23, the beam is not uniform in intensity, but varies more or less smoothly from a minimum, as indicated at 51 in Fig. 4, to a maximum as at 53.

Figure 5:
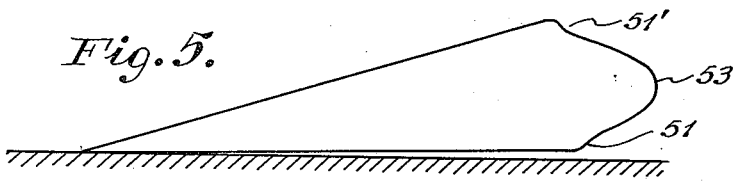

The elevation angle $a$ at which the maximum or peak 53 appears at any particular instant depends upon the position of the phase front modifying element 21 between the horns 5 and 23, and thus upon the angular position of the rotatable drum assembly. As the drum is rotated by the motor 27, the variations in intensity of the beam move likewise in elevation. Fig. 5 shows the shape of the beam when the drum has rotated to move the phase front modifying element downward from the position corresponding to Fig. 4 by a distance of about one-fourth the width of the mouth of the horn 5. It is seen that the maximum 53 has moved downward through a certain angle, and the minimum 51 has moved partly off the bottom of the pattern, while a new minimum 51' has begun to appear at the top.

In Fig. 6, which corresponds to further rotation of the drum through an angle equal to that between the positions of Figs. 4 and 5, the maximum 53 has moved to the bottom of the pattern. Fig. 7, representing a still later position of the drum, shows the maximum 53 partly off the bottom of the pattern, while a new maximum 53' is beginning to enter the top. As the drum continues to rotate, the cycle represented by Figs. 4–7 is repeated periodically, with 300 maxima and 300 minima per second passing through any given line of elevation.

The intensity of the radiation arriving at the airborne receiver 35 varies cyclically, at the frequency of 300 cycles per second, and this variation is exactly the same as if the signal were modulated at that frequency at the transmitter. The instantaneous amplitude at any particular instant is a function of elevation angle, as shown by Figs. 4–7, and thus the phase of the pattern-variation modulation depends upon the elevation angle of the receiver 35 above the horizontal plane through the transmitter.

The instantaneous magnitude of the output of the reference phase generator 29 on the other hand is independent of the position of the receiver, and is a function only of the angular position of the shaft 19. Thus the phase difference between the reproduced 300 cycle reference phase signal, appearing at the output of the demodulator 41, and the 300 cycle pattern-variation modulation signal coming out of the filter 37, is directly related to the elevation angle of the airborne receiver.

Referring to Fig. 8, a radiation pattern like that of Fig. 4 is shown, with oscillograms on various elevation lines illustrating the phase relationships between the two 300 cycle signals at those elevations. The dotted lines represent the reference phase signal, which is the same at all elevations, and the solid lines show the pattern-variation signal. At the elevation $a_1$, the two signals are in phase. At the elevation $a_2$, the variable phase signal leads the reference phase signal by 90 degrees. At the elevation $a_3$, the difference is 180 degrees.

It will be apparent that the total possible phase variation between the two signals will depend upon the overall width of the beam and the number of phase front modifying elements 21 in the drum assembly. Preferably these factors are so related that the total phase variation between the top and bottom of the beam is somewhat less than 360 degrees.

The phase shifter 45 is adjusted by means 49 according to the elevation angle of the desired glide path, so that as long as the airborne equipment is on the selected elevation line, the phase relationship between the two 300 cycle inputs to the phase detector 43 is such as to make the output to the indicator 47 zero. Thereafter, as the aircraft deviates above or below the glide path, the extent and direction of the departure is indicated.

It should be noted that the glide path angle is selected on the aircraft itself, and that such selection does not involve any adjustment of the ground station equipment and does not affect the signals received by any other aircraft. Moreover, the range of glide path angles which can be selected is limited only by the vertical coverage of the beam, and is not confined to a relatively small crossover region between two beams. There is no principal or preferred elevational line, and the accuracy of the system is the same at all elevation angles within the beam.

Since there is only one beam involved, the indications are independent of any variations in the transmitter output. Only one radiator and feed system is required and the radiation comes from a single apparent origin. Fig. 9 shows a modification of the airborne portion of the system of Fig. 1, for providing a direct indication of the angle of elevation instead of indicating deviation from a selected angle. The only difference between this system and that of Fig. 1 is that the output of the phase detector 43 goes to a servo or follow-up loop comprising an amplifier 55 and a reversible motor 57. The motor 57 is arranged to drive the phase shifter 45, and its angular position is indicated in terms of elevation angle by a dial and pointer 59. In operation, the output of the phase detector 43 controls the motor 57 to adjust the phase shifter 45 so that the phase detector output goes to zero. This positions the indicator 59 according to the amount of phase shift, and thus according to the elevation angle.

The deviation indicating function of Fig. 1 may be retained in Fig. 9 by providing a double throw switch 61 for applying the phase detector output to either the amplifier 55 or the zero-center meter 47, and including a disengageable clutch 63 in the connection between the motor 57 and the phase shifter 45. When the switch 61 is thrown to the right and the clutch 63 is disengaged, the servo loop is disabled and the operation of Fig. 9 becomes the same as that of Fig. 1.

One objection which has been made about straight line glide path systems is that the aircraft reaches the ground in a diving attitude, which may result in a bumpy landing. To prevent this it is desirable to curve or "flare" the lower end of the glide path in such manner that the steepness is gradually reduced and the aircraft approaches contact in a substantially level attitude. Another characteristic of glide path systems in general which sometimes causes trouble is the increasing response to minor deviations from the path as the ground station is approached. This effect may be reduced by the procedure known as "course softening" which involves the automatic reduction of the deflection sensitivity of the deviation indicator as the distance to the ground station decreases.

Fig. 10 shows a modification to the present system, incorporating means for producing flare and course softening. The glide path transmitter system, corresponding to the ground station of Fig. 1, is represented by the block 65. The airborne station includes the receiver 35, phase shifter 45, phase detector 43 and deviation indicator 47, substantially as in Fig. 1. In addition to the basic glide path system of Fig. 1, there is provided a distance measuring system or DME (distance measuring equipment) of known type which comprises a transmitter-receiver combination 67 at the aircraft station and a receiver-transmitter combination 69 at the ground station. Radio transmissions are originated at the device 67, received by means 69 at the ground station and relayed back to the aircraft station where the initially transmitted signals are compared with the finally received signals to produce an output corresponding to the round trip radiation travel time and therefore to the distance. The output of the DME unit 67 is applied to a servo or follow-up system 71, whose output shaft 73 is angularly positioned according to the distance of the aircraft station from the ground station. A cam 75 cut according to the desired relationship between elevation angle and distance for terminal curvature of the glide path is driven by the shaft 73 and operates a cam follower to control the phase shifter 45.

An adjustable attenuator 77 is provided in the connection between the phase detector 43 and the deviation indicator 47. The attenuator 77 is mechanically coupled to the DME servo shaft 73 as indicated by the dash line 79. The connection 79 may include a suitable cam arrangement, or alternatively the attenuator 77 may be designed to have an attenuation vs. rotation characteristic which is tapered according to the desired variation of deviation response as a function of distance for course softening.

In operation of the system of Fig. 10 the phase shifter 45 is controlled by way of the cam 75 as a function of the distance, providing a glide path which is curved according to the cam design. It should be noted that each aircraft or each type of aircraft may have a cam which is designed according to its own particular flight characteristics, and that the glide path selected for one aircraft does not place any limitation on the glide path which may be selected for any other aircraft. The attenuator 77, also driven from the DME shaft 73, simply reduces the deflection sensitivity of the indicator 47 as the ground station is approached. This prevents extreme deflections of the indicator 47 in response to minor deviations of the craft from the desired glide path, enabling the pilot to keep the aircraft reasonably close to the desired path without requiring unduly accurate control.

In ground approach and other aircraft operations, particularly in the vicinity of landing fields, it is frequently desirable to secure accurate altitude information. Altimeters of the terrain clearance indication type measure the altitude above the surface directly under the craft. Since many airports are surrounded by irregular terrain, this measurement does not tell the height over the landing field itself. According to the present invention, the height of an aircraft above the reference plane is determined independently of the terrain by triangulation based on measurements of the slant distance and elevation angle of the aircraft from the ground station.

Fig. 11 shows the airborne portion of a system for providing height indication. The ground station portion of the system may be identical with that of Fig. 10. The elevation responsive portion of the system, including the receiver 35, phase detector 43, phase shifter 45, motor amplifier 55 and motor 57 is arranged substantially as the corresponding elements are arranged in Fig. 9. The motor 57 is also coupled to a sine function generator 81, which provides an output either in the form of an electrical quantity such as voltage, or a mechanical quantity such as displacement of a shaft, corresponding to the sine of the elevation angle $a$. The airborne DME unit 67 provides an output, either electrical or mechanical, corresponding to the distance D of the aircraft from the ground station. A function multiplier 83 is connected to the sine function generator 81 and the DME unit 67 and provides an output corresponding to the product $D$ sine $a$ of the two inputs. This is representative of the height of the aircraft above the horizontal plane extending through the ground station.

As is known to those skilled in the art, the sine function generator 81 may include a constant voltage source and a voltage divider tapered to provide a sinusoidal resistance vs. rotation characteristic. The function multiplier may be merely a variable gain amplifier whose gain is controlled by the output of the function generator 81. The height indicator in this case would be a voltmeter 85, suitably calibrated in terms of height.

An alternative arrangement is shown in Fig. 12, wherein the elevation servomotor 57 operates a shaft 87 connected to a pinion 89, and the DME servomotor 71 is coupled through a shaft 91 to a lead screw 93. The lead screw is supported in suitable bearings on an arm 95 which is pivoted near one of its ends at the point 97. The free end of the arm 95 carries a toothed sector 99 in engagement with the pinion 89. A slidable pivot assembly 101 is carried radially along the arm 95 by the lead screw 93. The pivot assembly 101 is also slidable in a slotted horizontal member 103 which is provided at one of its ends with a rack 105 suitably restrained by bearings, not shown, for vertical motion only. The rack 105 engages a pinion 107 which is connected through a shaft 109 to a dial and pointer arrangement 111. The device 111 is calibrated in terms of height.

In the operation of the system of Fig. 12, the arm 95, and with it the lead screw 93 is maintained at the angle $a$ with respect to the horizontal by the elevation servo 57. The radial distance of the pivot point 101 from the point 97 is controlled by the DME servo 71 in accordance with the slant distance D of the aircraft from the ground station. The vertical height of the pivot point 101 above the point 97 is thus proportional to $D$ sine $a$ and to the height H of the aircraft above the reference plane. The displacement of the rack 105 from its reference position is equal to the height of point 101 to point 97 and thus corresponds to the height of the aircraft, which is indicated by the device 111.

Although the vertical plane coverage of the beam produced by the antenna arrangement of Fig. 1 may be made large enough to include any practical range of glide path angles, it may be desirable to provide a "fly down" indication on aircraft which is well above the useful upper limit of the beam. This indication need not be quantitative; for instance, an off-scale deflection of the pointer of the meter 47 would be sufficient.

The described function may be obtained by providing an auxiliary radiator 115 behind the lens 26 and below the directive antenna 3, and supplying it with energy from the transmitter 1 modulated directly at 300 cycles, with a relatively large fixed phase difference with respect to the reference phase generator 29. The antenna 115 may be simply a horizontal dipole, fed from transmitter 1 through a modulator 117. The device 117 may be a mechanical modulator such as a paddle wheel or variable capacitor driven by the shaft 19, or a small amplifier modulated by the output of the reference phase generator 29.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. A radio glide path system including a ground station comprising a radio transmitter, antenna means for radiating directively the output of said transmitter in a beam of substantial vertical thickness, means for cyclically modifying the phase front of said beam in the vertical plane whereby the intensity of said beam along any elevation line therein varies, the phase of said radiation being a function of said elevation, means for producing a reference phase signal and modulating said transmitter thereby; at least one aircraft station comprising a receiver responsive to said transmissions from said ground station to reproduce said reference phase signal and to produce a variable phase signal corresponding to said variations in said phase front of said beam, and phase comparison means connected to said receiver and responsive to said last mentioned signals to indicate the phase relationship therebetween, in terms of the elevation angle of said aircraft station.

2. The invention as set forth in claim 1, including at said ground station further radiator means energized by said transmitter to provide a second beam of constant phase front directed above said first beam, and means for modulating the energy applied to said further radiator with a signal like said reference phase signal but displaced in phase with respect thereto.

3. A radio height finder system for aircraft comprising means including a transmitter at a reference location for establishing a directive radiation field which varies in intensity in characteristic phase at different angles of elevation with respect to said reference point, a reference phase generator connected to said transmitter to modulate said field with a reference phase signal, an aircraft station including receiver means for reproducing said reference phase modulation and producing a signal corresponding to said elevation-characteristic intensity variations, and phase comparator means responsive to said two last mentioned signals to provide an output representative of the elevation angle of said aircraft station with respect to said reference point; radio distance measuring equipment for providing on said aircraft an output representative of the distance of said craft from said reference point, and means responsive to said two last mentioned outputs to provide an indication of the height of said craft above the plane of said reference point.

4. A radio height finder system for aircraft comprising means including a transmitter at a reference location for establishing a directive radiation field which varies in intensity in characteristic phase according to the angle of elevation with respect to said reference point, a reference phase generator connected to said transmitter to modulate said field with a reference phase signal, and an aircraft station including means responsive to said radiation field to provide an output representative of the elevation angle of said aircraft station with respect to said reference point; radio distance measuring equipment for providing on said aircraft an output representative of the distance of said craft from said reference point, and means responsive to said two last mentioned outputs to provide an indication of the height of said craft above the plane of said reference point.

5. In a radio glide path system of the described type providing elevation angle information in terms of the phase difference between two signals produced on an aircraft, means for controlling the curvature of the glide path to be followed by said aircraft including radio distance measuring equipment for producing on said craft a signal representative of the distance thereof from a reference point, and phase shifter means responsive to said last mentioned signal to vary the phase of one of said first mentioned signals with respect to the other according to said desired curvature.

6. In a radio glide path system of the described type including phase comparison means providing elevation angle information in response to the phase difference between two signals produced on an aircraft, course softening means including radio distance measuring equipment for producing on said craft a signal representative of the distance thereof from a reference point, and means responsive to said last mentioned signal to vary the response sensitivity of said phase comparison means.

7. A system for flying aircraft along a selected glide path, including a station at a reference location comprising a transmitter, means for radiating the output of said transmitter in a beam extending throughout a sector which includes said glide path, means periodically varying the phase front of said beam to modulate each elevational element thereof in a phase corresponding to the respective elevation of said element, and means for generating and transmitting a reference phase signal; a mobile station on said aircraft comprising means responsive to the transmission from said reference station to reproduce said reference phase signal and means responsive to the modulation of said beam to produce a further signal whose phase corresponds to the elevation angle of said craft, means for adjusting the phase of said reproduced reference phase signal to correspond with the elevation angle of said selected glide path, and indicator means responsive to said adjusted reference signal and to said further signal to indicate deviation of said craft from said glide path.

8. A system for flying aircraft along a selected glide path, including a station at a reference location comprising a transmitter, a directive antenna for radiating the output of said transmitter in a beam extending throughout a vertical sector which includes said glide path, means for periodically varying the phase front of said beam to vary the intensity of each elevational element thereof in a phase corresponding to the respective elevation of said element, means for generating a reference phase signal and modulating said transmitter with said signal; a mobile station on said aircraft comprising means responsive to the transmission from said reference station to reproduce said reference phase signal and to produce a further signal whose phase corresponds to said variation in intensity of said beam according to the elevation angle of said craft, means for adjusting the phase of said reproduced reference phase signal, and means responsive to said adjusted reference signal and to said further signal to indicate elevation of said craft.

9. A system for flying aircraft along a selected glide path, including a station at a reference location comprising means for radiating a beam extending continuously throughout a sector which includes said glide path, means for modulating said beam to vary each elevational element thereof in a phase corresponding to the respective elevation of said element, means for generating a reference phase signal and transmitting said signal to the aircraft; a mobile station on said aircraft comprising means for reproducing said reference phase signal and means for producing a further signal whose phase corresponds to said modulation of said beam according to the elevation angle of said craft, and indicator means responsive to said reference signal and to said further signal to indicate the elevation of said craft.

10. A radio glide path system for aircraft, including a transmitter, directive antenna means connected to said transmitter and arranged to provide a radio beam of substantial vertical thickness including the range of elevation angles through which the system is to be used, means for modulating said beam in a phase which is different at each elevation, the phase of said modulation being characteristic of the elevation angle, and means for producing and transmitting a constant phase reference signal.

11. An antenna for radio glide path systems and the like, including a plane-polarized radiator element, a spaced pair of conductive plates in planes perpendicular to the direction of polarization of said element and on opposite sides of said element, means for rotating said plates about the axis of polarization of said element, and phase front modifying means comprising pairs of conductive rods supported between said plates and movable therewith around said radiator element, each pair being collinear and parallel to said axis.

12. Apparatus of the class described, including an aircraft station comprising a radio receiver adapted to receive radio signals modulated in a phase which varies according to elevation and also modulated in a reference phase, said receiver including means for demodulating said radio signals and separately reproducing the modulation signals, means for adjusting the phase of one of said modulation signals, and phase comparison means responsive to said adjusted modulation signal and to the other of said modulation signals to indicate the phase difference between them.

13. The invention set forth in claim 11, including an electromagnetic horn enclosing a sector around said axis, said phase front modifying means being angularly spaced around said axis at intervals approximately equal to the angular width of said sector.

JOSEPH LYMAN.
GEORGE B. LITCHFORD.

References Cited in the file of this patent
UNITED STATES PATENTS

| Number | Name | Date |
| --- | --- | --- |
| 2,415,242 | Hershberger | Feb. 4, 1947 |
| 2,434,253 | Beck | Jan. 13, 1948 |
| 2,439,044 | Ferrill | Apr. 6, 1948 |
| 2,459,482 | Bond | Jan. 18, 1949 |
| 2,460,401 | Southworth | Feb. 1, 1949 |
| 2,480,068 | Wolff | Aug. 23, 1949 |
| 2,480,181 | Breen | Aug. 30, 1949 |
| 2,482,162 | Feldman | Sept. 20, 1949 |
| 2,484,651 | Rost | Oct. 11, 1949 |
| 2,495,722 | Hoffman | Jan. 31, 1950 |
| 2,498,730 | Williams | Feb. 28, 1950 |
| 2,502,317 | Ewing | Mar. 28, 1950 |
| 2,527,222 | Iams | Oct. 24, 1950 |
| 2,539,905 | Herbst | Jan. 30, 1951 |
| 2,564,703 | Litchford et al. | Aug. 21, 1951 |
| 2,572,041 | Litchford et al. | Oct. 23, 1951 |